(12) United States Patent
Okuno (10) Patent No.: US 8,054,525 B2
(45) Date of Patent: Nov. 8, 2011

(54) WAVELENGTH CONVERTER

(75) Inventor: Toshiaki Okuno, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 13 days.

(21) Appl. No.: 12/530,753

(22) PCT Filed: Mar. 13, 2008

(86) PCT No.: PCT/JP2008/054571
§ 371 (c)(1),
(2), (4) Date: Sep. 10, 2009

(87) PCT Pub. No.: WO2008/111633
PCT Pub. Date: Sep. 18, 2008

(65) Prior Publication Data
US 2010/0134868 A1      Jun. 3, 2010

(30) Foreign Application Priority Data
Mar. 14, 2007  (JP) .................... 2007-065452

(51) Int. Cl.
*G02F 1/03* (2006.01)
(52) U.S. Cl. ...................... 359/244; 359/288
(58) Field of Classification Search ............ 359/244, 359/288
See application file for complete search history.

(56) References Cited

U.S. PATENT DOCUMENTS

| | | | |
|---|---|---|---|
| 5,007,705 A | 4/1991 | Morey et al. | |
| 6,424,774 B1 * | 7/2002 | Takeda et al. | 385/122 |
| 2005/0168803 A1 * | 8/2005 | Kalish et al. | 359/334 |
| 2005/0264871 A1 | 12/2005 | Takahashi et al. | |
| 2009/0003786 A1 | 1/2009 | Takahashi et al. | |
| 2009/0207481 A1 | 8/2009 | Okuno | |

FOREIGN PATENT DOCUMENTS

| | | |
|---|---|---|
| JP | 63-58303 | 3/1988 |
| JP | 5-502951 | 5/1993 |

(Continued)

OTHER PUBLICATIONS

Takahashi et al., "Dispersion tuning by stretching down-sized highly nonlinear fiber", The Institute of Electronics, Information and Communication Engineers Sogo Taikai Koen Ronbunshu, vol. 2007 Communications No. 2, p. 375 (2007).

(Continued)

*Primary Examiner* — Scott J Sugarman
*Assistant Examiner* — James Jones
(74) *Attorney, Agent, or Firm* — Venable LLP; Michael A. Sartori; Leigh D. Thelen (57) ABSTRACT

Provided is a wavelength converter having a simple and low-cost structure. The wavelength converter generates converted light having a wavelength different from that of input light. The wavelength converter includes (1) a pump light source that outputs pump light, (2) an optical multiplexer that combines and outputs input light and the pump light, (3) a first optical fiber that receives and guides the input light and the pump light that have been combined and output by the optical multiplexer and generates converted light using a nonlinear optical phenomenon that occurs while the first optical fiber guides the input light and the pump light, the first optical fiber being coiled, and (4) zero-dispersion wavelength adjusting means that adjusts a zero-dispersion wavelength of the first optical fiber.

14 Claims, 10 Drawing Sheets

FOREIGN PATENT DOCUMENTS

| | | |
|---|---|---|
| JP | 2000-031901 | 1/2000 |
| WO | WO 91/10156 A2 | 7/1991 |
| WO | WO 2007/000690 A1 | 9/2007 |
| WO | WO 2007/100060 A1 | 9/2007 |
| WO | WO-2008/075633 A1 | 6/2008 |

OTHER PUBLICATIONS

Onishi et al., "Highly nonlinear dispersion shifted fiber and its application to broadband wavelength converter", Proc. 23$^{rd}$ ECOC 97, Conference Publication No. 448, pp. 115-118 (1997).

K. Inoue, "Tunable and selective wavelength conversion using fiber four-wave mixing with two pump lights", Optics Letters, vol. 6, No. 12, pp. 1451-1453 (1994).

Takahashi et al., "Experiment of zero dispersion tuning by stretching down-sized HNLF", Proc. 32$^{nd}$ ECOC 2006, Th.1.5.1, vol. 4, pp. 41-42 (2006).

Okuno et al., "Silica-based functional fibers with enhanced nonlinearity and their applications", IEEE Journal of Selected Topics in Quantum Electron, vol. 5, No. 5, pp. 1385-1391(1999).

Okuno et al., "Highly nonlinear and perfectly dispersion-flattened fibres for efficient optical signal processing applications", Electronics Letters, vol. 39, No. 13 (2003).

Hansryd et al., "Increase of the SBS threshold in a short highly nonlinear fiber by applying a temperature distribution", Journal of Lightwave Technology, vol. 19, No. 11, pp. 1691-1697 (2001).

K. Inoue, "Arrangement of fiber pieces for a wide wavelength conversion range by fiber four-wave mixing", Optics Letters, vol. 19, No. 16, pp. 1189-1191 (1994).

Hirano et al., "Silica-Based Highly Nonlinear Fibers and their Application," *IEEE Journal of Selected Topics in Quantum Electronics*, vol. 15, No. 1, pp. 103-113 (2009).

\* cited by examiner

WAVELENGTH CONVERTER

TECHNICAL FIELD

The present invention relates to a wavelength converter that generates converted light having a wavelength different from that of input light.

BACKGROUND ART

Some wavelength converters generate converted light having a wavelength different from that of input light by using a nonlinear optical phenomenon, such as four-wave mixing, that occurs in an optical fiber. Non-patent Document 1 (M. Onishi, et al.: Proc. 23rd ECOC, 1997, vol. 2, p. 115) discloses that a desired wavelength conversion characteristic can be obtained by adjusting the wavelength of pump light, which is input to an optical fiber, in accordance with the zero-dispersion wavelength of the optical fiber. Non-patent Document 2 (K. Inoue, et al.: IEEE Photonics Technology Lett., vol. 6 (1994) 1451) discloses a wavelength-tunable light source that can be used for such a purpose. A wavelength converter using the wavelength-tunable light source has a complex structure and is expensive.

On the other hand, attempts have been made to obtain a desired wavelength conversion characteristic by adjusting the zero-dispersion wavelength of an optical fiber. For example, Non-patent Document 3 (M. Takahashi et al.: Proc. 32nd ECOC 2006 Th.1.5.1) discloses a method for shifting the zero-dispersion wavelength of a highly nonlinear fiber by stretching the fiber. However, Non-patent Document 3 does not disclose a specific method for applying tension to the fiber. In particular, a method for repeatedly changing tension is not examined in Non-patent Document 3.

Non-patent Document 1: M. Onishi, et al.: Proc. 23rd ECOC, 1997, vol. 2, p. 115.
Non-patent Document 2: K. Inoue, et al.: IEEE Photonics Technology Lett., vol. 6 (1994) 1451.
Non-patent Document 3: M. Takahashi et al.: Proc. 32nd ECOC 2006 Th.1.5.1.
Non-patent Document 4: T. Okuno, et al.: IEEE J. Select. Topics in Quantum Electron. Vol. 5 (1999) 1385.
Non-patent Document 5: T. Okuno, et al.: Electron. Left. vol. 39 (2003) 972.

DISCLOSURE OF INVENTION

Problems to be Solved by the Invention

An object of the invention is to provide a wavelength converter having a simple and low-cost structure.

Means of Solving the Problems

To achieve the object, a wavelength converter that generates converted light having a wavelength different from that of input light is provided. The wavelength converter includes (1) a pump light source that outputs pump light, (2) an optical multiplexer that combines and outputs input light and the pump light, (3) a first optical fiber that receives and guides the input light and the pump light that have been combined and output by the optical multiplexer and generates converted light using a nonlinear optical phenomenon that occurs while the first optical fiber guides the input light and the pump light, the first optical fiber being coiled, and (4) zero-dispersion wavelength adjusting means that adjusts a zero-dispersion wavelength of the first optical fiber.

In the wavelength converter according to the invention, it is preferable that the first optical fiber be a highly nonlinear fiber (an optical fiber with a nonlinear coefficient $\gamma$ equal to or greater than $10\ W^{-1}\ km^{-1}$). The zero-dispersion wavelength adjusting means can adjust the zero-dispersion wavelength of the first optical fiber by adjusting the temperature, the stress, or the tension of the first optical fiber. When the zero-dispersion wavelength is adjusted by adjusting the temperature, it is preferable that a temperature adjustment range be equal to or greater than 40° C. When the zero-dispersion wavelength is adjusted by adjusting the stress, the zero-dispersion wavelength adjusting means changes the inside diameter of the first optical fiber being coiled. It is preferable that the wavelength converter according to the invention further includes (a) a detector that detects a state of the first optical fiber, (b) a controller that controls an adjustment of the zero-dispersion wavelength of the first optical fiber by the zero-dispersion wavelength adjusting means on the basis of a result of the detection by the detector.

It is preferable that the zero-dispersion wavelength adjusting means be configured such that portions to which the temperature, tension, or stress is applied can be separately controlled. With this configuration, the zero-dispersion wavelength adjusting means can adjust the zero-dispersion wavelength of an optical fiber such that the zero-dispersion wavelength is substantially constant across a coil of the optical fiber. Without separate control, the same result can be achieved with a simple structure by providing a control system with a pre-designed condition that makes the zero-dispersion wavelength be constant along the length with respect to each zero-dispersion wavelength. Moreover, an optical fiber, which is to be coiled, can be prepared such that the outer diameter, the core diameter, and the residual stress characteristic are changed along the length. By using such an optical fiber, a substantially constant zero-dispersion wavelength can be provided across the coil even with a simple zero-dispersion wavelength adjusting means having, for example, one control point.

In addition, the wavelength converter according to the invention may include a plurality of fibers having different characteristics and each being coiled or a plurality of fibers having the same characteristic and each being coiled. In this case, the zero-dispersion wavelength adjusting means simultaneously or independently adjusts the temperatures, the stresses, or the tensions of the optical fibers so as to adjust the zero-dispersion wavelengths of the optical fibers.

BEST MODES FOR CARRYING OUT THE INVENTION

Hereinafter, embodiments of the invention are described with reference to the drawings. The drawings are for illustrative purposes only, and do not limit the scope of the invention. In the drawings, the same numerals denote the same elements so as to avoid redundant description. Ratios of dimensions in the drawings are not necessarily accurate.

First Embodiment

Figure 1:
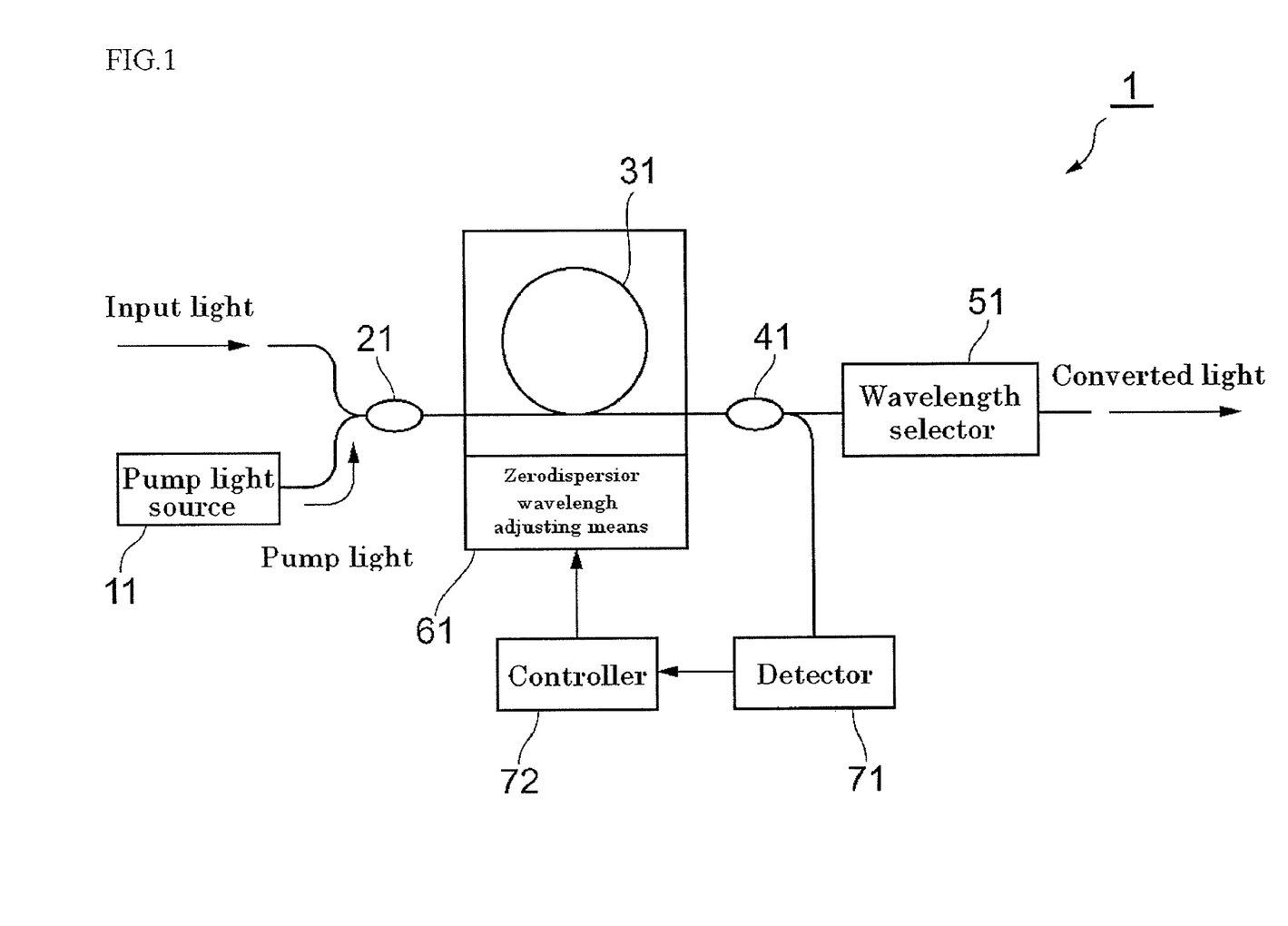
FIG. 1 is a conceptual diagram of a wavelength converter according to a first embodiment of the invention.

FIG. 1 is a conceptual diagram of a wavelength converter 1 according to a first embodiment of the invention. In the wavelength converter 1, a pump light source 11 outputs pump light. An optical multiplexer 21 receives input light to be converted and the pump light that has been output from the pump light source 11, and the optical multiplexer 21 combines and outputs the input light and the pump light. An optical fiber 31 receives the input light and the pump light that have been combined and output from the optical multiplexer 21 at one end thereof, and guides the input light and the pump light. The optical fiber 31 generates converted light using a nonlinear optical phenomenon (four-wave mixing) that occurs while the optical fiber 31 guides the input light and the pump light, and outputs the converted light from the other end thereof. The optical fiber 31 has a zero-dispersion wavelength in the vicinity of the pump light wavelength. The light output from the other end of the optical fiber 31 includes not only the converted light but also the pump light and light having the same wavelength as that of the input light.

It is preferable that the optical fiber 31 be a highly nonlinear fiber (an optical fiber with a nonlinear coefficient γ equal to or greater than 10 $W^{-1}$ $km^{-1}$). Examples of highly nonlinear fibers are disclosed in Non-patent Document 4 (T. Okuno, et al.: IEEE J. Select. Topics in Quantum Electron. Vol. 5 (1999) 1385) and Non-patent Document 5 (T. Okuno, et al.: Electron. Lett. vol. 39 (2003) 972). In this case, the wavelength converter 1 has a high wavelength conversion efficiency, so that the length of the optical fiber 31 can be shortened. Therefore, polarization mode dispersion, stimulated Brillouin scattering, and variation of dispersion characteristics along the length can be reduced. It is preferable that the optical fiber 31 be coiled. In this case, the wavelength converter can be made small and easy-to-handle.

An optical demultiplexer 41 outputs almost all the light that has been output from the optical fiber 31 to a wavelength selector 51 while splitting a part of the light and outputs the part to a detector 71. The wavelength selector 51 receives light that has been output from the optical demultiplexer 41 and has reached the wavelength selector 51, and selectively outputs converted light among the received light. The wavelength selector 51 is, for example, an optical filter, an optical separator, or the like.

A zero-dispersion wavelength adjusting means 61 adjusts the zero-dispersion wavelength of the optical fiber 31. The zero-dispersion wavelength adjusting means 61 adjusts the zero-dispersion wavelength of the optical fiber 31 by adjusting the temperature, the stress, or the tension of the optical fiber 31. When the zero-dispersion wavelength adjusting means 61 adjusts the temperature of the optical fiber 31, it is preferable that the temperature adjustment range be equal to or greater than 40° C. In this case, the adjustment amount of the zero-dispersion wavelength of the optical fiber 31 can be made sufficiently large, so that the adjustment amount of the wavelength conversion characteristic of the wavelength converter 1 can be made sufficiently large.

The detector 71 receives light that has been split by the optical demultiplexer 41 and has reached the detector 71, and detects a state of the optical fiber 31 on the basis of the result of receiving the light. At this time, the detector 71 detects the state of the optical fiber 31 on the basis of the power of received light, the spectrum of the received light, or the power of the converted light among the received light. On the basis of the result of the detection by the detector 71, the controller 72 controls the adjustment of the zero-dispersion wavelength of the optical fiber 31 by the zero-dispersion wavelength adjusting means 61.

The wavelength converter 1 operates as follows. Input light to be converted and pump light that has been output from the pump light source 11 are combined by the optical multiplexer 21 and input to one end of the optical fiber 31. While the input light and the pump light are being guided along the optical fiber 31, a nonlinear optical phenomenon occurs, so that converted light having a wavelength different from that of the input light is generated in the optical fiber 31. The converted light generated in the optical fiber 31 is output from the other end of the optical fiber 31, and the converted light passes through the optical demultiplexer 41 and the wavelength selector 51 so as to be output.

At this time, the zero-dispersion wavelength adjusting means 61 adjusts the zero-dispersion wavelength of the optical fiber 31, so that the wavelength conversion characteristic of the wavelength converter 1 can be adjusted. Moreover, the detector 71 detects the state of the optical fiber 31. On the basis of the result of the detection by the detector 71, the controller 72 controls the adjustment of the zero-dispersion wavelength of the optical fiber 31 by the zero-dispersion wavelength adjusting means 61. With this configuration, the wavelength conversion characteristic can not only be adjusted but stably maintained to be a desired characteristic. Moreover, the wavelength converter 1 has a simple and low-cost structure.

In particular, it is known that the phase matching of four-wave mixing shifts to a longer wavelength when an input power is high. Thus, controlling the zero-dispersion wavelength in accordance with the input power may be necessary in some cases. Also in such a case, the invention enables flexible operation by, for example, controlling or maintaining the conversion bandwidth without changing the wavelength in accordance with the increase/decrease of the input power.

It is assumed that the pump light wavelength is 1549.4 nm and the optical fiber 31 is a highly nonlinear fiber having characteristics shown in Table at the pump light wavelength and having a length of 1 km. The differential coefficient $(d\lambda_0/dT)$ of the zero-dispersion wavelength $\lambda_0$ is 0.02 nm/° C. at room temperature. The wavelength dependence of the dispersion slope and the zero-dispersion wavelength of the optical fiber 31 are uniform along the length.

TABLE

| | |
|---|---|
| Differential coefficient of zero-dispersion wavelength ($d\lambda_0/dT$) | 0.02 nm/° C. |
| Chromatic dispersion | 0.024 ps/nm/km |
| Dispersion slope | 0.03 ps/nm²/km |
| Attenuation | 0.5 dB/km |
| Nonlinear coefficient γ | 20 $W^{-1}km^{-1}$ |

Figure 2:
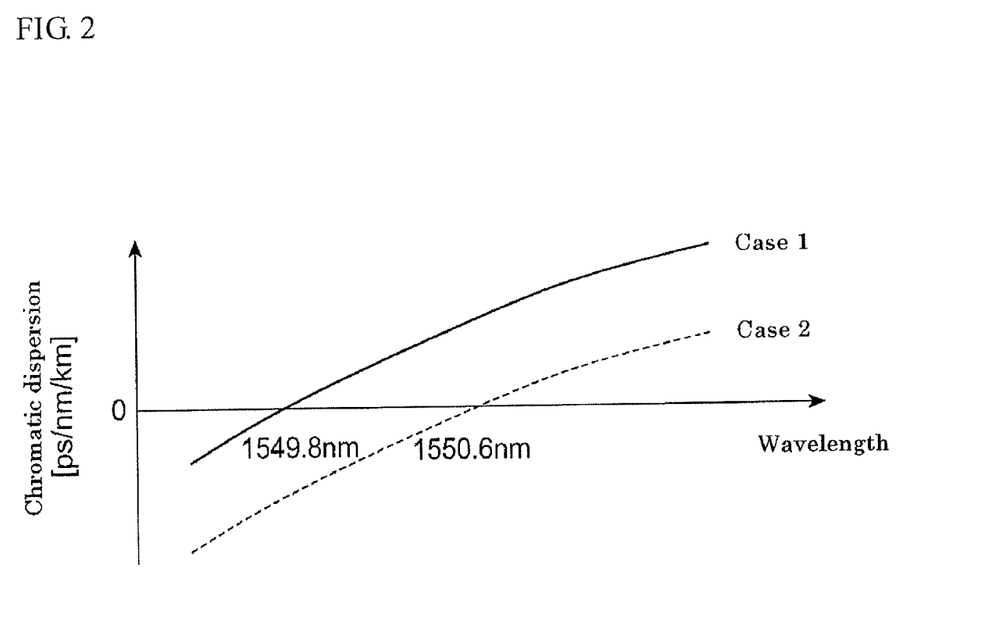
FIG. 2 is a graph showing chromatic dispersion characteristics of an optical fiber included in the wavelength converter according to the first embodiment.

Because the optical fiber 31 has a differential coefficient ($d\lambda_0/dT$) of 0.02 nm/° C., the zero-dispersion wavelength changes by 0.8 nm when the temperature changes by 40° C. FIG. 2 is a graph showing chromatic dispersion characteristics of the optical fiber 31. The solid line shows the chromatic dispersion characteristic (case 1) at temperature $T_0$, and the broken line shows the chromatic dispersion characteristic (case 2) at temperature ($T_0+40°$ C.). In case 1, the zero-dispersion wavelength is 1549.8 nm. In case 2, the zero-dispersion wavelength is 1550.6 nm.

Figure 3:
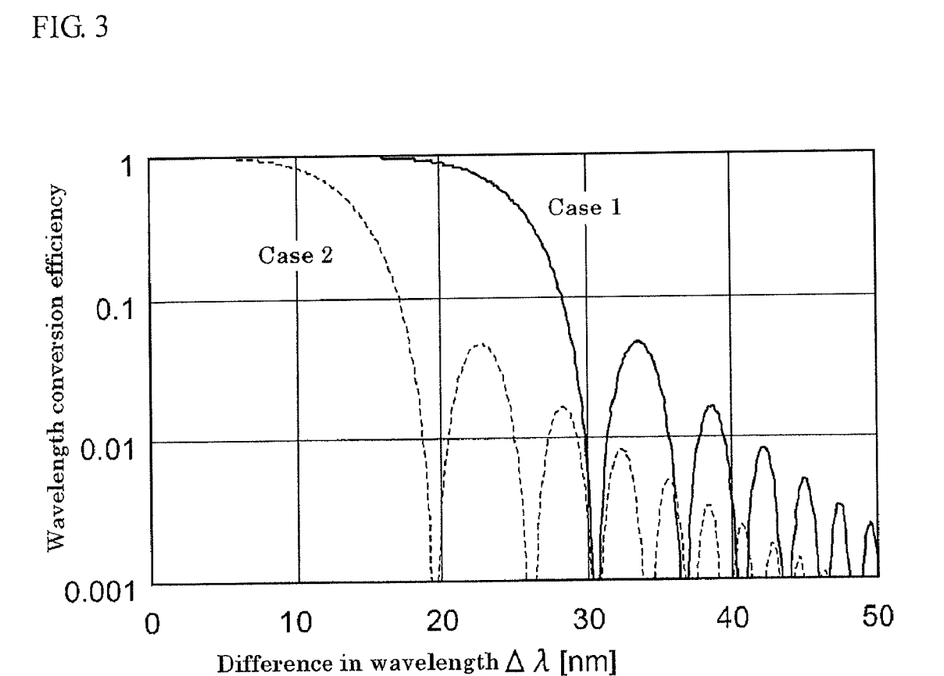
FIG. 3 is a graph showing wavelength conversion efficiency characteristics of the wavelength converter according to the first embodiment.

FIG. 3 is a graph showing wavelength conversion efficiency characteristics of the wavelength converter 1. The abscissa represents the difference Δλ between the wavelengths of input light and pump light. The ordinate represents the wavelength conversion efficiency η that is normalized by the wavelength conversion efficiency when the wavelengths of input light and pump light are the same. The wavelength conversion bandwidth (full width at half maximum) is 49.2 nm for case 1 and 23.6 nm for case 2.

FIGS. 4 to 7 are conceptual diagrams showing exemplifying structures 611 to 614 of the zero-dispersion wavelength adjusting means 61. In the structures shown in FIGS. 4 to 7, the optical fiber 31 is coiled around the body of a bobbin 33.

Figure 4:
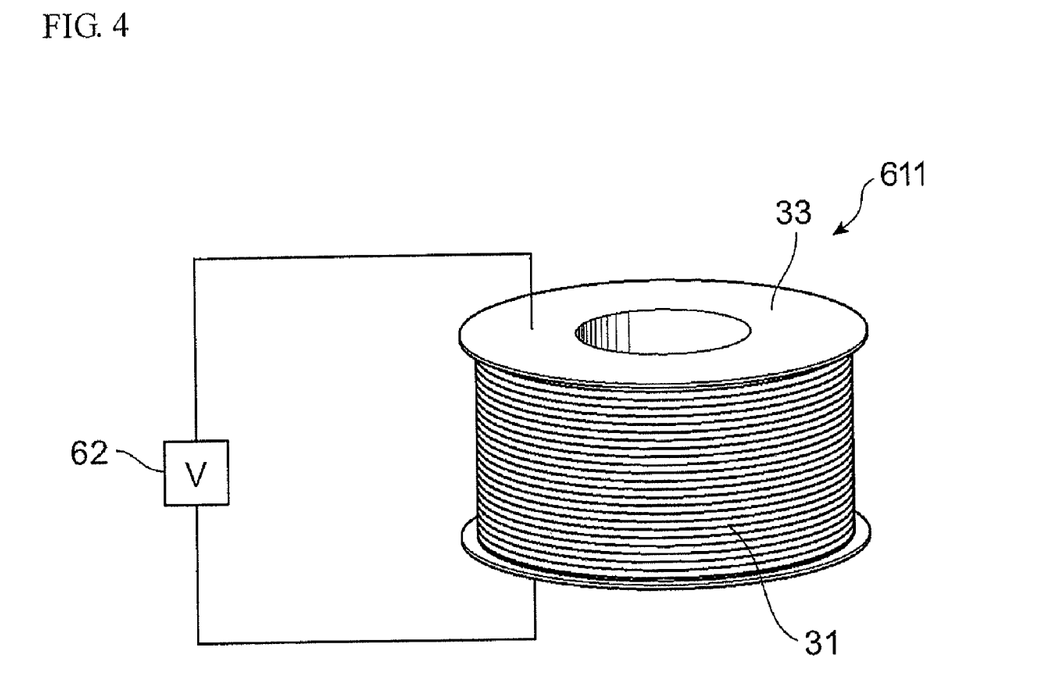
FIG. 4 is a conceptual diagram showing an exemplifying structure of zero-dispersion wavelength adjusting means included in the wavelength converter according to the first embodiment.

Zero-dispersion wavelength adjusting means 611 shown in FIG. 4 includes a voltage supply 62. The voltage supply 62 adjusts the zero-dispersion wavelength of the optical fiber 31 by applying a voltage to the bobbin 33 so that an electric current passes through the bobbin 33 and thereby heating the optical fiber 31. The zero-dispersion wavelength adjusting means 611 may include a heater or a Pertier device provided to the bobbin 33 or the optical fiber 31 so as to heat the optical fiber 31 and thereby adjust the zero-dispersion wavelength of the optical fiber 31.

Figure 5:
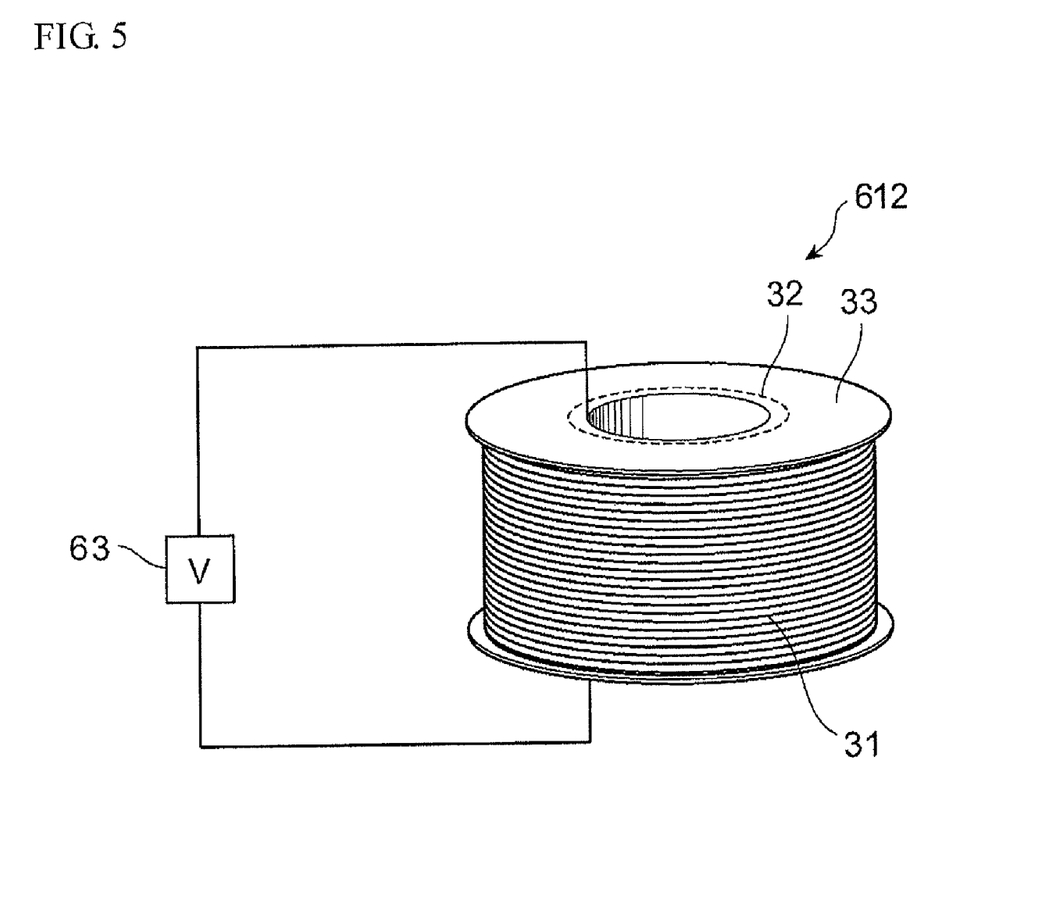
FIG. 5 is a conceptual diagram showing another exemplifying structure of the zero-dispersion wavelength adjusting means included in the wavelength converter according to the first embodiment.

Zero-dispersion wavelength adjusting means 612 shown in FIG. 5 includes a voltage supply 63. The voltage supply 63 adjusts the zero-dispersion wavelength of the optical fiber 31 by applying a voltage to a body 32 of the bobbin 33 so that an electric current passes through the body 32 and thereby thermally expanding the body 32 and changing the stress of the optical fiber 31.

Figure 6:
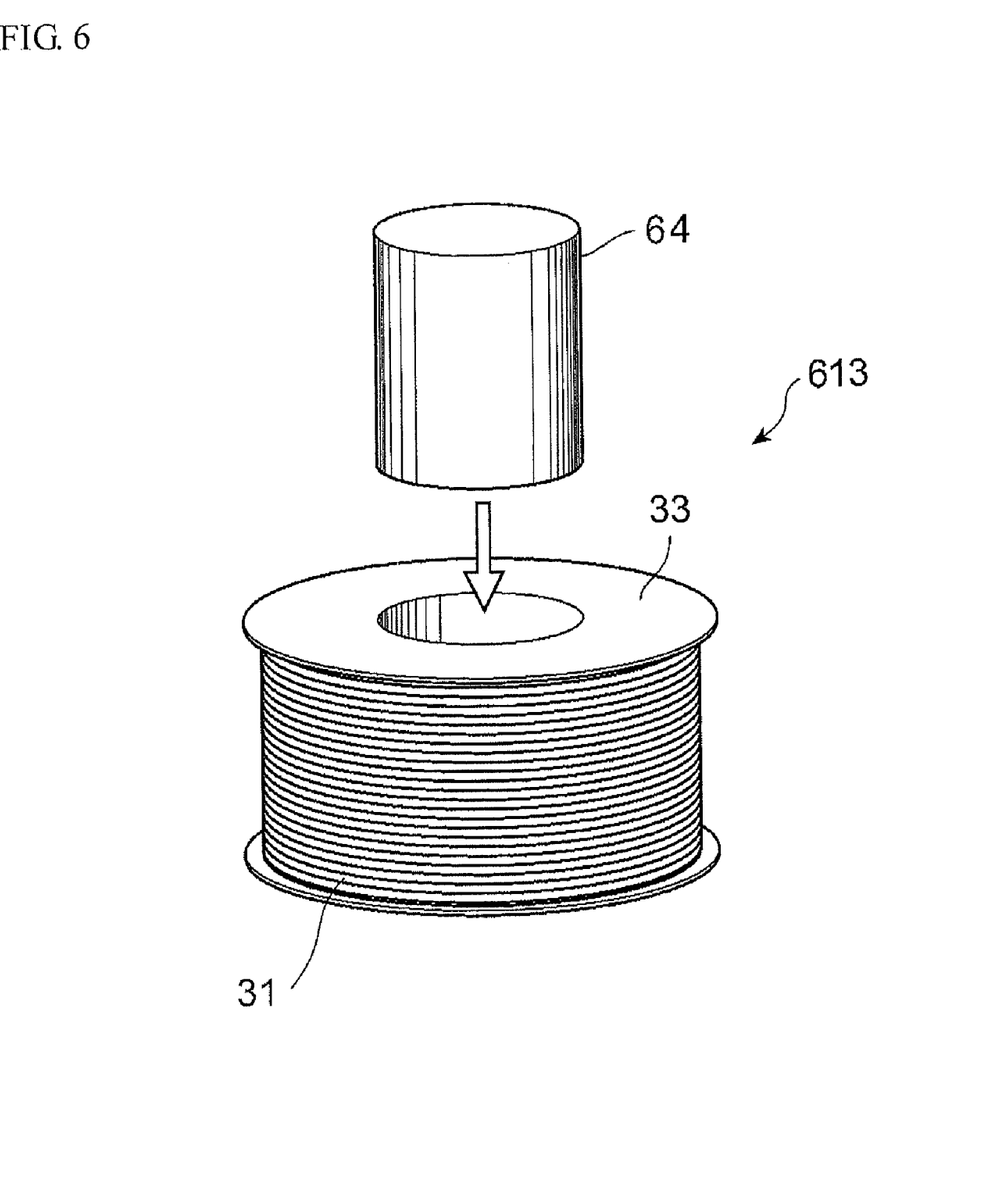
FIG. 6 is a conceptual diagram showing still another exemplifying structure of the zero-dispersion wavelength adjusting means included in the wavelength converter according to the first embodiment.

Zero-dispersion wavelength adjusting means 613 shown in FIG. 6 includes an expandable and contractible member 64. The expandable and contractible member 64 is a cylinder-shaped member that is inserted into the body of the bobbin 33. The expandable and contractible member can expand and contract in radial directions by using a piezoelectric device or the like. The expandable and contractible member 64 adjusts the zero-dispersion wavelength of the optical fiber 31 by expanding and contracting in radial directions so that the stress of the optical fiber 31 is changed. The body of the bobbin itself may be the piezoelectric device.

Figure 7:
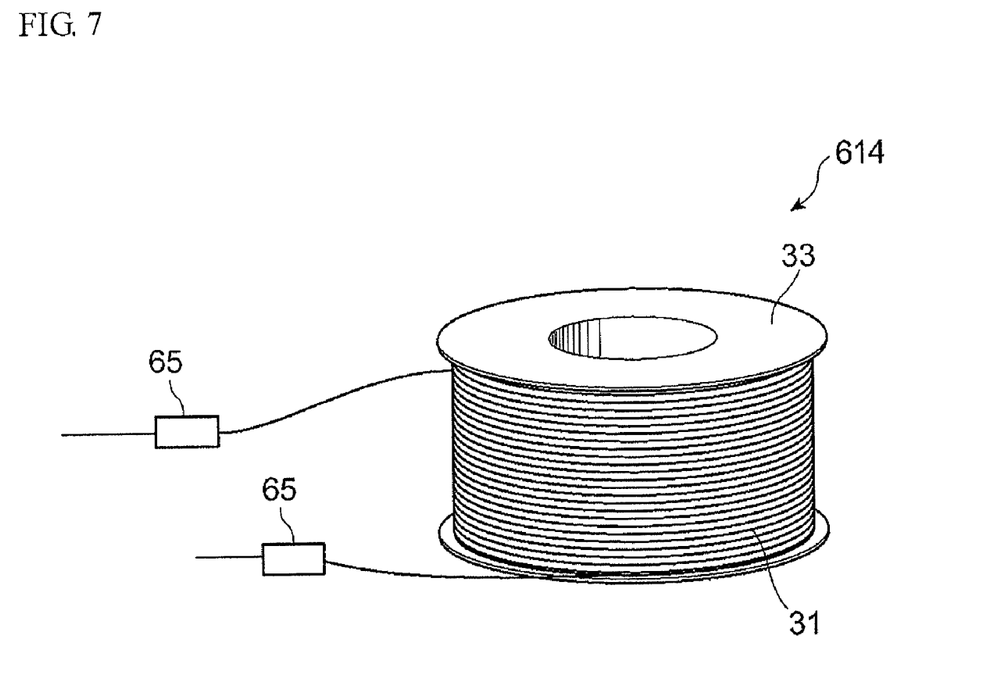
FIG. 7 is a conceptual diagram showing still another exemplifying structure of the zero-dispersion wavelength adjusting means included in the wavelength converter according to the first embodiment.

Zero-dispersion wavelength adjusting means 614 shown in FIG. 7 includes tension-applying units 65. The tension-applying units 65, which are movable while holding the ends of the optical fiber 31, adjust the zero-dispersion wavelength of the optical fiber 31 by applying tension to the optical fiber 31.

Alternatively, the bobbin 33 may rotate so that tension is applied to the optical fiber 31 and the zero-dispersion wavelength of the optical fiber 31 is adjusted.

Second Embodiment

Figure 8:
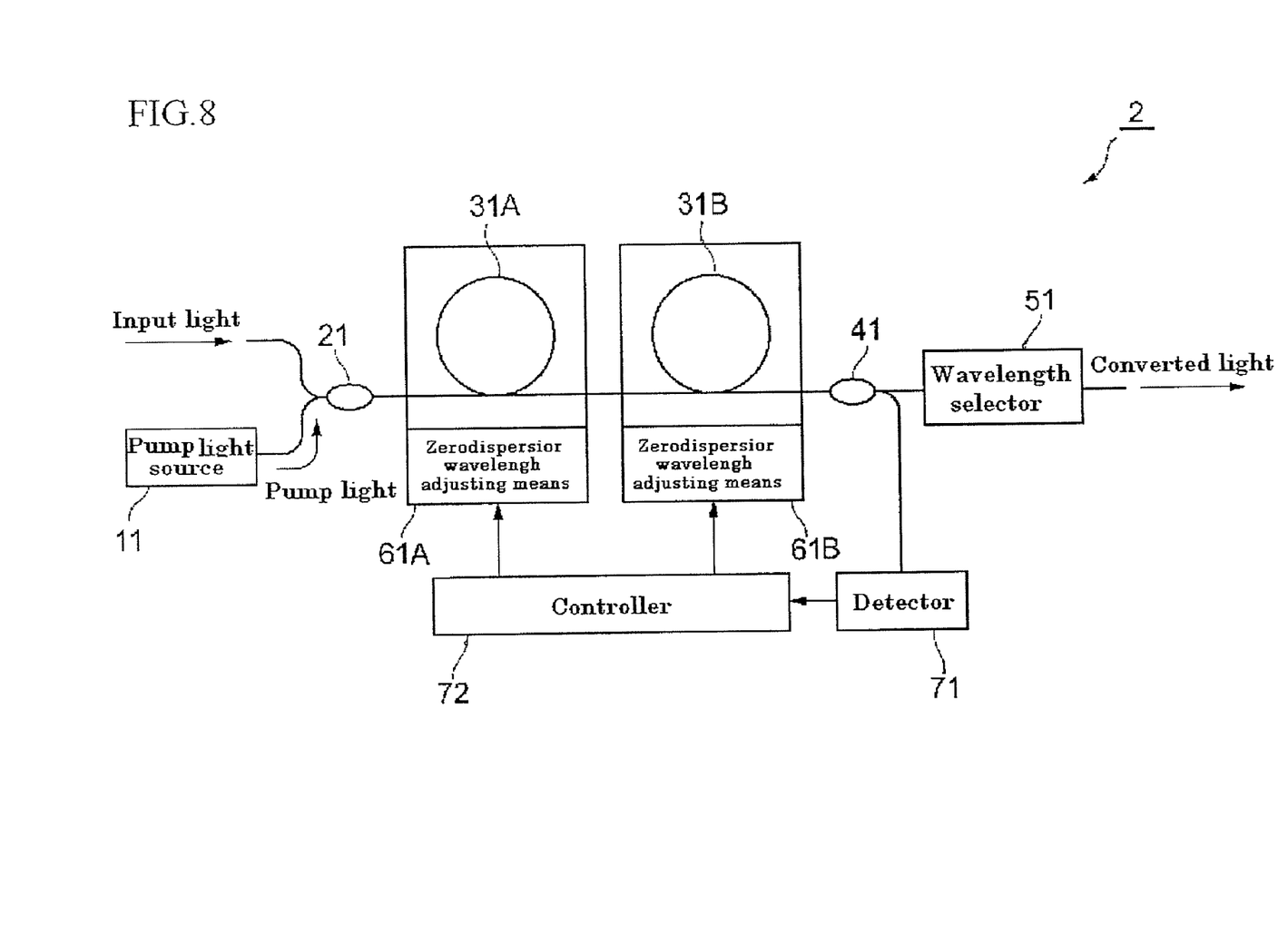
FIG. 8 is a conceptual diagram of a wavelength converter according to a second embodiment of the invention.

FIG. 8 is a conceptual diagram of a wavelength converter 2 according to a second embodiment of the invention. Each of optical fibers 31A and 31B is similar to the optical fiber 31 in the first embodiment. The optical fibers 31A and 31B may be of the same kind or of different kinds. Each of zero-dispersion wavelength adjusting means 61A and 61B is similar to the zero-dispersion wavelength adjusting means 61 in the first embodiment. The zero-dispersion wavelength adjusting means 61A adjusts the zero-dispersion wavelength of the optical fiber 31A. The zero-dispersion wavelength adjusting means 61B adjusts the zero-dispersion wavelength of the optical fiber 31B.

The wavelength converter 2 operates as follows. Input light to be converted and pump light that has been output from a pump light source 11 are combined by an optical multiplexer 21 and input to one end of the optical fiber 31A. While the input light and the pump light, which have been input to one end of the optical fiber 31A, are guided along the optical fibers 31A and 31B, a nonlinear optical phenomenon occurs, so that converted light having a wavelength different from that of the input light is generated in the optical fibers 31A and 31B. The converted light generated in the optical fibers 31A and 31B is output from the other end of the optical fiber 31B, and the converted light passes through the optical demultiplexer 41 and the wavelength selector 51 so as to be output.

At this time, the zero-dispersion wavelength adjusting means 61A adjusts the zero-dispersion wavelength of the optical fiber 31A and the zero-dispersion wavelength adjusting means 61B adjusts the zero-dispersion wavelength of the optical fiber 31B, so that the wavelength conversion characteristic of the wavelength converter 2 can be adjusted. Moreover, the detector 71 detects the states of the optical fibers 31A and 31B. On the basis of the results of the detection by the detector 71, the controller 72 controls the adjustment of the zero-dispersion wavelengths of the optical fibers 31A and 31B by the zero-dispersion wavelength adjusting means 61A and 61B. Thus, in addition to having a simple and low-cost structure, the second embodiment enables to increase the total flexibility of controlling the wavelength conversion characteristic by having a plurality of coils that are serially connected.

Third Embodiment

Figure 9:
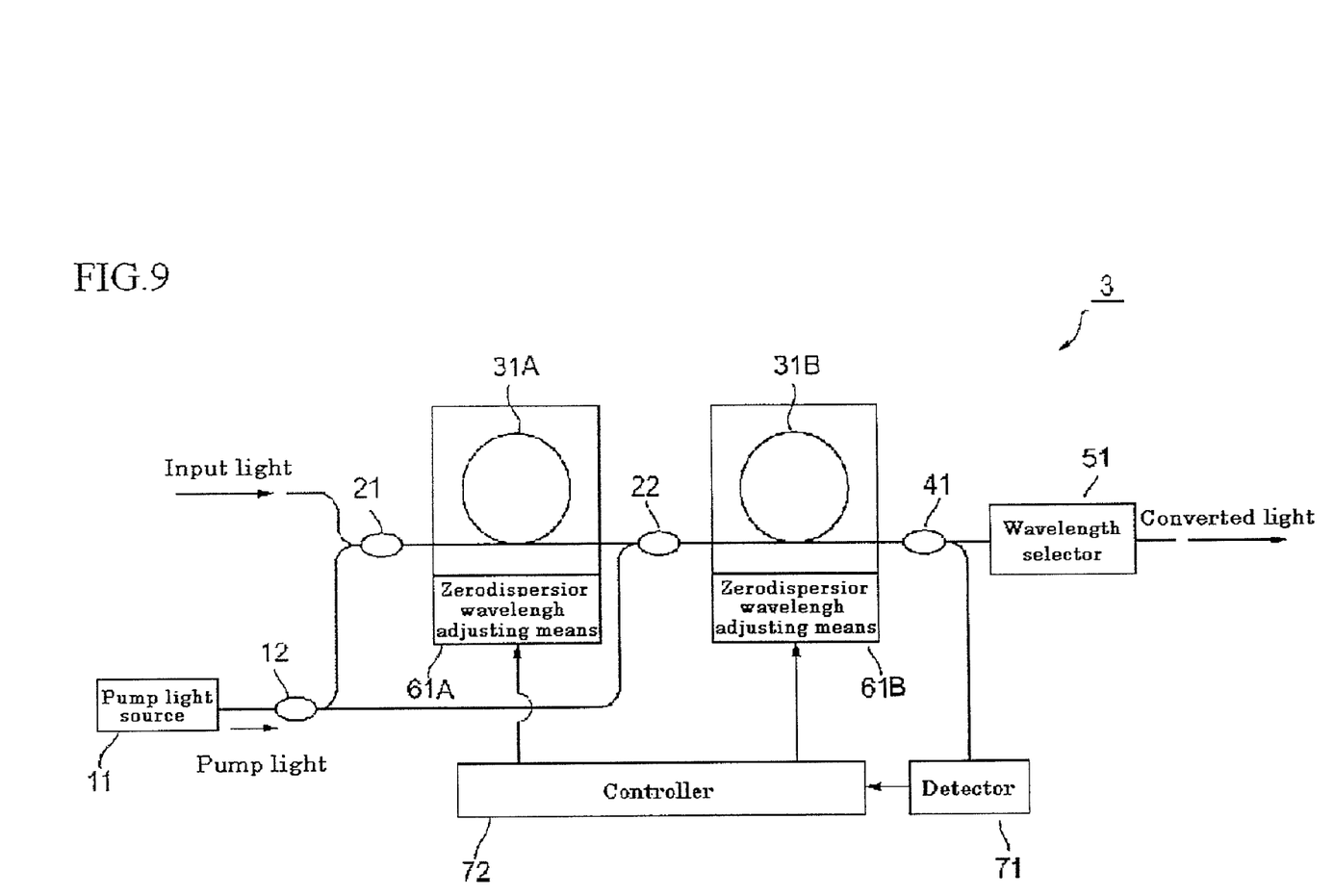
FIG. 9 is a conceptual diagram of a wavelength converter according to a third embodiment of the invention.

FIG. 9 is a conceptual diagram of a wavelength converter 3 according to a third embodiment of the invention. In addition to the structure of the wavelength converter 2, the wavelength converter 3 further includes an optical demultiplexer 12 and an optical multiplexer 22. The optical demultiplexer 12 bifurcates pump light that has been output from a pump light source 11, and outputs the bifurcated pump light to the optical multiplexers 21 and 22. Input light to be converted and the pump light that has reached from the optical demultiplexer 12 are input to the optical multiplexer 21. The optical multiplexer 21 combines and outputs the input light and the pump light to an optical fiber 31A. Light that has been output from the optical fiber 31A and the pump light that has reached from the optical demultiplexer 12 are input to the optical multiplexer 22. The optical multiplexer 22 combines and outputs these light to an optical fiber 31B.

The wavelength converter 3 operates as follows. Input light to be converted and one part of pump light that has been output form the pump light source 11 and bifurcated by the optical demultiplexer 12 are combined by the optical multiplexer 21 and input to one end of the optical fiber 31A. Light output from the other end of the optical fiber 31A and the other part of pump light that has been output from the pump light source 11 and bifurcated by the optical demultiplexer 12 are combined by the optical multiplexer 22 and input to one end of the optical fiber 31B. While the input light and the pump light are guided along the optical fibers 31A and 31B, a nonlinear optical phenomenon occurs, so that converted light having a wavelength different from that of the input light is generated in the optical fibers 31A and 31B. The converted light that has been generated in the optical fibers 31A and 31B is output from the other end of the optical fiber 31B, and the converted light passes through an optical demultiplexer 41 and a wavelength selector 51 so as to be output.

At this time, the zero-dispersion wavelength adjusting means 61A adjusts the zero-dispersion wavelength of the optical fiber 31A and the zero-dispersion wavelength adjusting means 61B adjusts the zero-dispersion wavelength of the optical fiber 31B, so that the wavelength conversion characteristic of the wavelength converter 3 can be adjusted. A detector 71 detects the states of the optical fibers 31A and 31B. On the basis of the results of the detection by the detector 71, a controller 72 adjusts the adjustment of the zero-dispersion wavelength of the optical fibers 31A and 31B by the zero-dispersion wavelength adjusting means 61A and 61B. Thus, the wavelength converter 3 has a simple and low-cost structure.

It is preferable that the branching ratio of the demultiplexer 12 or the powers of branched outputs be variable. In this case, the conversion efficiencies of the optical fibers 31A and 31B can be independently adjusted. It is preferable that the demultiplexer 12 be also controlled by the controller 72.

Fourth Embodiment

Figure 10:
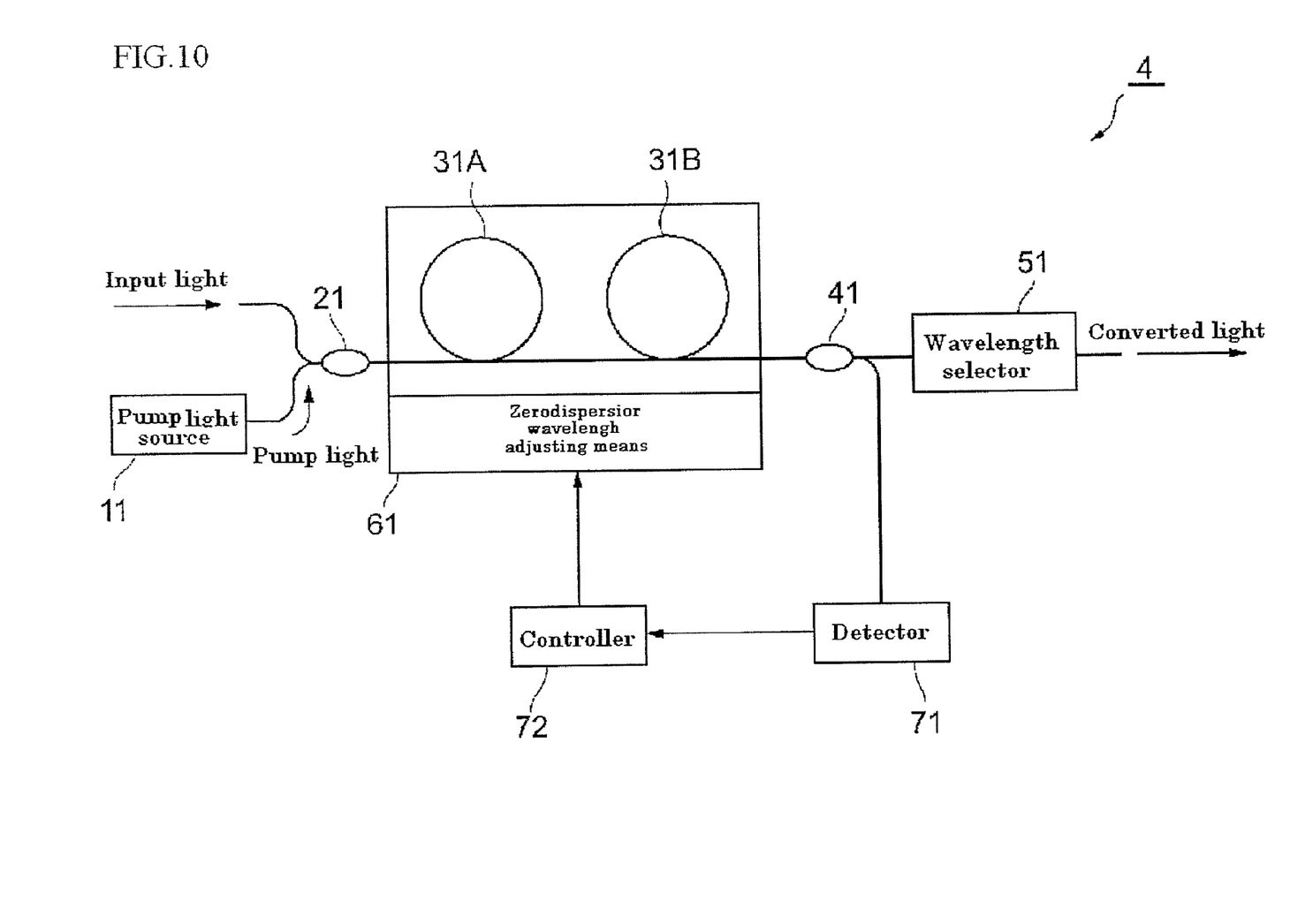
FIG. 10 is a conceptual diagram of a wavelength converter according to a fourth embodiment of the invention.

FIG. 10 is a conceptual diagram of a wavelength converter 4 according to a fourth embodiment of the invention. The wavelength converter 4 is different in that common zero-dispersion wavelength adjusting means 61 adjusts the zero-dispersion wavelength of each of two optical fibers 31A and 31B.

The wavelength converter 4 operates as follows. Input light to be converted and pump light that has been output from a pump light source 11 are combined by an optical multiplexer 21 and input to one end of an optical fiber 31A. While the input light and pump light that have been input to one end of the optical fiber 31A are guided along the optical fibers 31A and 31B, a nonlinear optical phenomenon occurs, so that converted light having a wavelength different from that of the input light is generated in the optical fibers 31A and 31B. The converted light generated in the optical fibers 31A and 31B is output from the other end of the optical fiber 31B, and the converted light passes through an optical demultiplexer 41 and a wavelength selector 51 so as to be output.

At this time, the zero-dispersion wavelength adjusting means 61 adjusts the zero-dispersion wavelengths of the optical fibers 31A and 31B, so that the wavelength conversion characteristic of the wavelength converter 4 can be adjusted. Moreover, a detector 71 detects the states of the optical fibers 31A and 31B. On the basis of the results of the detection by the detector 71, a controller 72 controls the adjustment of the zero-dispersion wavelengths of the optical fibers 31A and 31B by the zero-dispersion wavelength adjusting means 61.

Thus, the wavelength converter 4 has a simple and low-cost structure. If the dispersion slopes of the optical fibers 31A and 31B are the same, the difference between the zero-dispersion wavelengths of the optical fibers 31A and 31B is constant even when the temperature is changed.

A wavelength converter having a simple and low-cost structure is provided. The wavelength converter is suitable for an optical communications system.

The invention claimed is:

1. A wavelength converter that generates converted light having a wavelength different from that of input light, the wavelength converter comprising:
    a pump light source that outputs pump light;
    an optical multiplexer that combines and outputs input light and the pump light;
    a first optical fiber that receives and guides the input light and the pump light that have been combined and output by the optical multiplexer and generates converted light using a nonlinear optical phenomenon that occurs while the first optical fiber guides the input light and the pump light, the first optical fiber being coiled; and
    zero-dispersion wavelength adjusting means that adjusts a zero-dispersion wavelength of the first optical fiber, wherein
    the zero-dispersion wavelength adjusting means adjusts a temperature of the first optical fiber, and
    wherein a temperature adjustment range of the first optical fiber adjusted by the zero-dispersion wavelength adjusting means is equal to or greater than 40° C.

2. The wavelength converter according to claim 1, wherein the first optical fiber is a highly nonlinear fiber.

3. A wavelength converter that generates converted light having a wavelength different from that of input light, the wavelength converter comprising:
    a pump light source that outputs pump light;
    an optical multiplexer that combines and outputs input light and the pump light;
    a first optical fiber that receives and guides the input light and the pump light that have been combined and output by the optical multiplexer and generates converted light using a nonlinear optical phenomenon that occurs while the first optical fiber guides the input light and the pump light, the first optical fiber being coiled; and
    zero-dispersion wavelength adjusting means that adjusts a zero-dispersion wavelength of the first optical fiber,
    wherein the zero-dispersion wavelength adjusting means adjusts a stress of the first optical fiber, and
    wherein the zero-dispersion wavelength adjusting means changes an inside diameter of the first optical fiber being coiled.

4. The wavelength converter according to claim 1, further comprising:
    a detector that detects a state of the first optical fiber; and
    a controller that controls an adjustment of the zero-dispersion wavelength of the first optical fiber by the zero-dispersion wavelength adjusting means on the basis of a result of the detection by the detector.

5. The wavelength converter according to claim 1, wherein the zero-dispersion wavelength adjusting means adjusts the zero-dispersion wavelength of the first optical fiber to be constant.

6. A wavelength converter, that generates converted light having a wavelength different from that of input light, the wavelength converter comprising:
    a pump light source that outputs pump light;
    an optical multiplexer that combines and outputs input light and the pump light;

a first optical fiber that receives and guides the input light and the pump light that have been combined and output by the optical multiplexer and generates converted light using a nonlinear optical phenomenon that occurs while the first optical fiber guides the input light and the pump light, the first optical fiber being coiled; and zero-dispersion wavelength adjusting means that adjusts a zero-dispersion wavelength of the first optical fiber; and further comprising a second optical fiber that receives and guides the input light and the pump light that have been combined and output by the optical multiplexer and generates converted light using a nonlinear optical phenomenon that occurs while the second optical fiber guides the input light and the pump light, the second optical fiber being coiled, wherein the zero-dispersion wavelength adjusting means adjusts zero-dispersion wavelengths of the first optical fiber and the second optical fiber by simultaneously or independently adjusting temperatures, stresses, or tensions of the first optical fiber and the second optical fiber.

7. The wavelength converter according to claim 6, wherein the first optical fiber and the second optical fiber are the same kind of optical fibers.

8. The wavelength converter according to claim 6, wherein the first optical fiber and the second optical fiber are different kinds of optical fibers.

9. The wavelength converter according to claim 3, wherein the first optical fiber is a highly nonlinear fiber.

10. The wavelength converter according to claim 3, further comprising:
   a detector that detects a state of the first optical fiber; and
   a controller that controls an adjustment of the zero-dispersion wavelength of the first optical fiber by the zero-dispersion wavelength adjusting means on the basis of a result of the detection by the detector.

11. The wavelength converter according to claim 3, wherein the zero-dispersion wavelength adjusting means adjusts the zero-dispersion wavelength of the first optical fiber to be constant.

12. The wavelength converter according to claim 6, wherein the first optical fiber is a highly nonlinear fiber.

13. The wavelength converter according to claim 6, further comprising:
   a detector that detects a state of the first optical fiber; and
   a controller that controls an adjustment of the zero-dispersion wavelength of the first optical fiber by the zero-dispersion wavelength adjusting means on the basis of a result of the detection by the detector.

14. The wavelength converter according to claim 6, wherein the zero-dispersion wavelength adjusting means adjusts the zero-dispersion wavelength of the first optical fiber to be constant.

* * * * *